United States Patent
Durham et al.

(10) Patent No.: US 10,725,849 B2
(45) Date of Patent: Jul. 28, 2020

(54) SERVER RAS LEVERAGING MULTI-KEY ENCRYPTION

(71) Applicant: Intel Corporation, Santa Clara, CA (US)

(72) Inventors: David Durham, Beaverton, OR (US); Siddhartha Chhabra, Portland, OR (US); Kai Cong, Hillsboro, OR (US); Ron Gabor, Herzliya (IS)

(73) Assignee: Intel Corporation, Santa Clara, CA (US)

( * ) Notice: Subject to any disclaimer, the term of this patent is extended or adjusted under 35 U.S.C. 154(b) by 173 days.

(21) Appl. No.: 16/047,638

(22) Filed: Jul. 27, 2018

(65) Prior Publication Data

US 2019/0050283 A1    Feb. 14, 2019

(51) Int. Cl.
*G06F 11/07* (2006.01)
*G06F 3/06* (2006.01)
*G06F 21/60* (2013.01)
*G06F 21/64* (2013.01)

(52) U.S. Cl.
CPC ........ *G06F 11/0787* (2013.01); *G06F 3/0659* (2013.01); *G06F 3/0673* (2013.01); *G06F 11/073* (2013.01); *G06F 11/0751* (2013.01); *G06F 21/602* (2013.01); *G06F 21/64* (2013.01); *G06F 3/0619* (2013.01); *G06F 2221/2107* (2013.01); *G06F 2221/2113* (2013.01)

(58) Field of Classification Search
CPC .. G06F 11/0751; G06F 11/0793; H04L 63/12; H04L 63/0428; H04L 63/0823; H04L 63/126; H04L 63/08; H04L 63/20
See application file for complete search history.

(56) References Cited

U.S. PATENT DOCUMENTS

| | | | |
|---|---|---|---|
| 8,452,934 B2 * | 5/2013 | Jogand-Coulomb | G06F 13/4243 711/102 |
| 9,990,249 B2 * | 6/2018 | Durham | G06F 11/1004 |
| 10,243,990 B1 * | 3/2019 | Chen | H04L 63/1466 |
| 2009/0016534 A1 * | 1/2009 | Ortiz Cornet | G06F 21/64 380/277 |
| 2013/0117401 A1 * | 5/2013 | Kumar | H04L 51/22 709/207 |
| 2017/0185532 A1 * | 6/2017 | Durham | G06F 11/1004 |
| 2018/0091308 A1 * | 3/2018 | Durham | G06F 11/1068 |

OTHER PUBLICATIONS

Kaplan et al., "AMD Memory Encryption", Whitepaper, amd-dev. wpengine.netdna-cdn.com/wordpress/media/2013/12/AMD_Memory_Encryption_Whitepaper_v7-Public.pdf, Apr. 21, 2016, 12 pages.

(Continued)

*Primary Examiner* — Nadeem Iqbal
(74) *Attorney, Agent, or Firm* — Jordan IP Law, LLC

(57) ABSTRACT

An embodiment of a semiconductor package apparatus may include technology to determine if an access request (e.g., a read or write request) to a memory location would result in an integrity failure and, if so determined, read previous data from the memory location, set an indicator to indicate the integrity failure, and store the previous data together with the indicator and previous authentication information. Other embodiments are disclosed and claimed.

25 Claims, 15 Drawing Sheets

(56) References Cited

OTHER PUBLICATIONS

"Intel Architecture Memory Encryption Technologies Specification", software.intel.com/sites/default/files/managed/a5/16/Multi-Key-Total-Memory-Encryption-Spec.pdf, Dec. 2017, 30 pages.
"Intel Xeon Scalable Processors", ark.intel.com/products/series/125191/Intel-Xeon-Scalable-Processors, retrieved on Jun. 20, 2018, 4 pages.
U.S. Appl. No. 15/635,548, entitled "Multi-Key Cryptographic Memory Protection", filed Jun. 28, 2017, 78 pages.

* cited by examiner

110

| Field | Offset (bytes) | Size (bytes) | Comments |
|---|---|---|---|
| KEYID | 0 | 2 | Key Identifier |
| KEYID_CTRL | 2 | 4 | KeyID control:<br><br>- Bits [7:0]: COMMAND<br>- Bits [23:8]: ENC_ALG<br>- Bits [31:24]: RSVD, MBZ |
| RSVD | 6 | 58 | RSVD, MBZ |
| KEY_FIELD_1 | 64 | 64 | Software supplied KeyID data key or entropy for KeyID data key |
| KEY_FIELD_2 | 128 | 64 | Software supplied KeyID tweak key or entropy for KeyID tweak key |

112

| Command | Encoding | Description |
|---|---|---|
| KEYID_SET_KEY_DIRECT | 0 | Set key domain key using the key provided (direct mode) |
| KEYID_SET_KEY_RANDOM | 1 | Set key domain key randomly (random mode), this key is generated by CPU and is not available to SW. The algorithm used to generate this key may be similar to TME key generation algorithm |
| KEYID_CLEAR_KEY | 2 | Clear the key associated with the domain. If a key is cleared, this KEYID gets TME behavior |
| KEYID_NO_KEY | 3 | No cryptographic encryption provided by MKTME for the KEYID |
| KEYID_AVAILABILITY_BYPASS | 4 | Availability bypass |

FIG. 10B

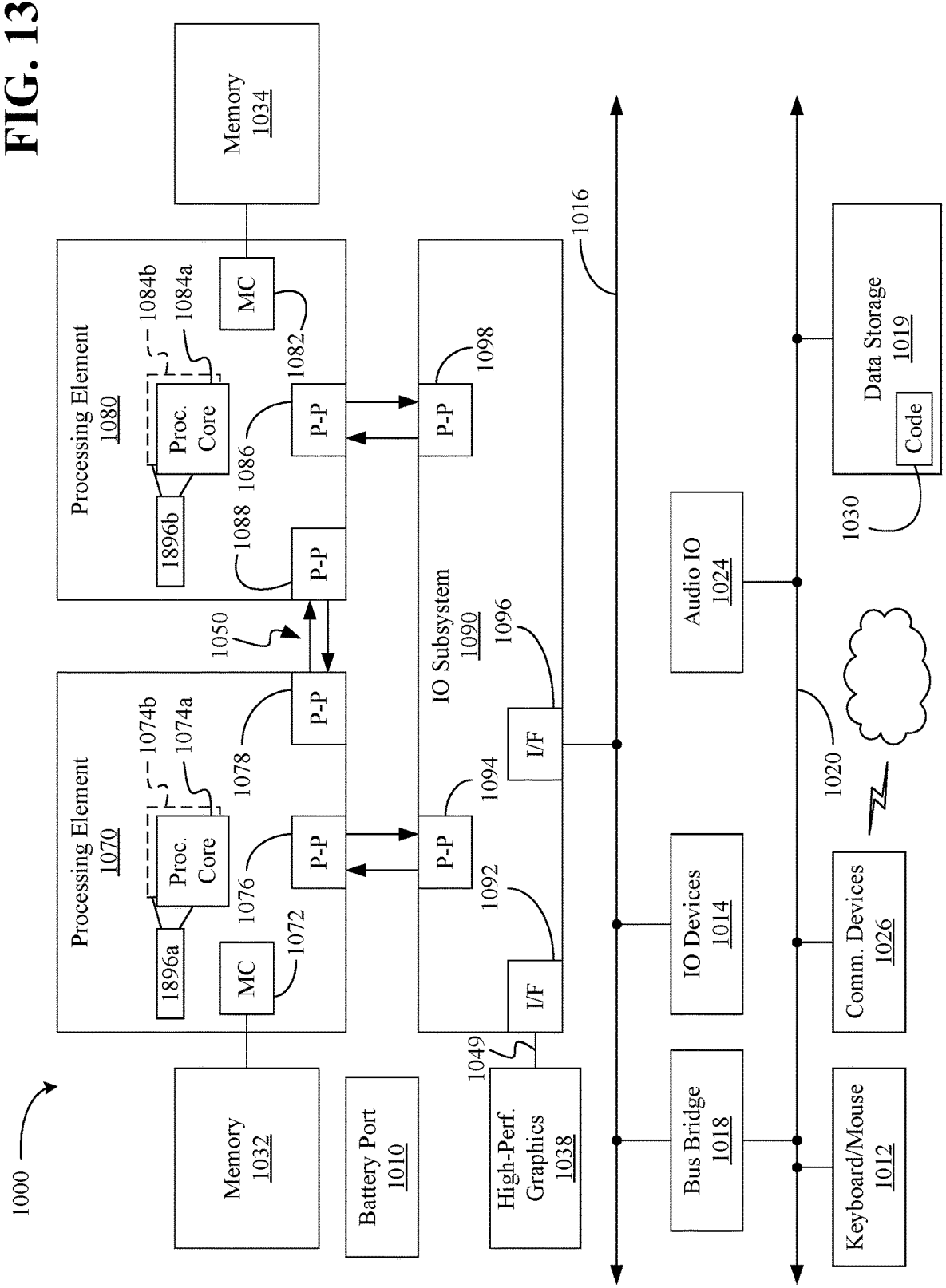

US 10,725,849 B2

1

SERVER RAS LEVERAGING MULTI-KEY ENCRYPTION

TECHNICAL FIELD

Embodiments generally relate to security systems. More particularly, embodiments relate to server reliability, availability, and survivability (RAS) leveraging multi-key encryption.

BACKGROUND

An electronic apparatus that includes a memory component may secure the contents of the memory through various encryption/decryption techniques. For servers or other platforms, for example, INTEL CORPORATION may provide TOTAL MEMORY ENCRYPTION (TME) technology and MULTI-KEY TME (MKTME) technology. ADVANCED MICRO DEVICES (AMD) may provide SECURE MEMORY ENCRYPTION (SME) and SECURE ENCRYPTED VIRTUALIZATION (SEV).

BRIEF DESCRIPTION OF THE DRAWINGS

The various advantages of the embodiments will become apparent to one skilled in the art by reading the following specification and appended claims, and by referencing the following drawings, in which:

FIG. 10B is an illustrative diagram of a table of instructions for a MKTME engine according to an embodiment;

FIG. 13 is a block diagram of an example of a computing system according to an embodiment.

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
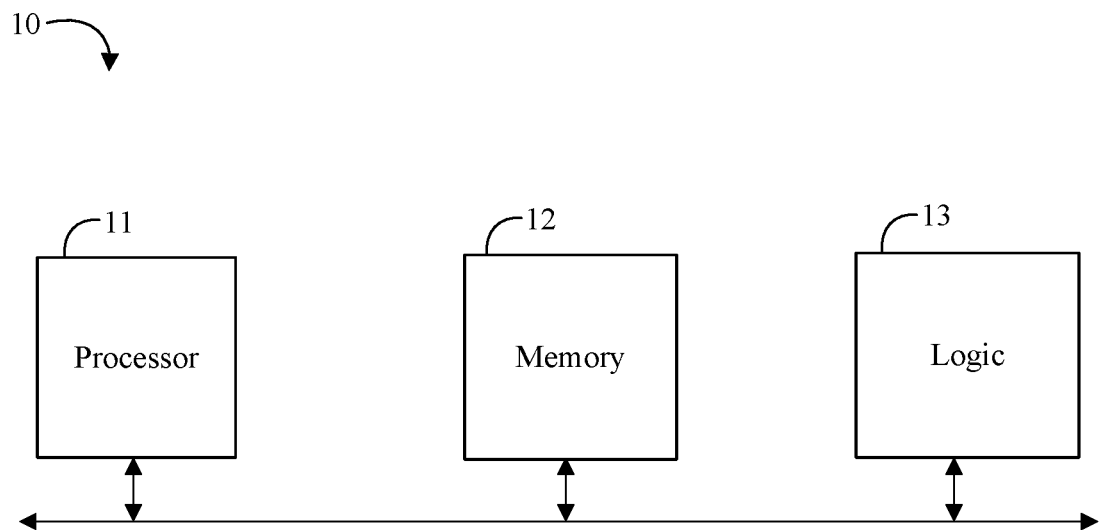
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 and the memory 12 to determine if an access request (e.g., a read or write request) to a memory location of the memory 12 would result in an integrity failure and, if so determined, read previous data from the memory location, set an indicator to indicate the integrity failure, and store the previous data together with the indicator and previous authentication information (e.g., store at another location in the memory 12, store in another memory or storage device, store in a buffer, store in a register, etc.). In some embodiments, the logic 13 may be configured to set a bit in the stored previous data as the indicator to indicate the integrity failure. For example, the previous authentication information may include a cryptographic message authentication code (MAC) associated with the previous data. In some embodiments, the logic 13 may also be configured to determine if an availability bypass mode is set, bypass encryption, decryption, and integrity checks if the availability bypass mode is set, and clear indicators of integrity failure for data sent to the processor 11 if the availability bypass mode is set. For example, the logic 13 may be further configured to restore data to the memory location in the availability bypass mode based on the previous data and the cryptographic MAC associated with the previous data (e.g., the previous data may be verified using the MAC). In any of the embodiments herein, the logic 13 may also be configured to identify a request to change a key assignment if the indicator is set to indicate the integrity failure and a pre-determined value is stored along with the indicator, and change the key assignment corresponding to the identified request. In some embodiments, the logic 13 may be located in, or co-located with, various components, including the processor 11 (e.g., on a same die).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general purpose processor, a special purpose processor, a central processor unit (CPU), a controller, a micro-controller, a memory controller, a storage controller, etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, determine if the access request to the memory location of the memory would result in an integrity failure, reading previous data from the memory location, setting the indicator to indicate the integrity failure, storing the previous data together with the indicator and previous authentication information, etc.).

Figure 2:
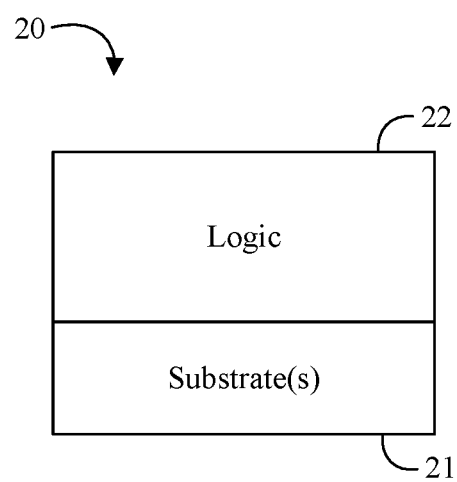
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to determine if an access request to a memory location would result in an integrity failure and, if so determined, read previous data from the memory location, set an indicator to indicate the integrity failure, and store the previous data together with the indicator and previous authentication information. In some embodiments, the logic 22 may be configured to set a bit in the stored previous data as the indicator to indicate the integrity failure. For example, the previous authentication information may include a cryptographic MAC associated with the previous data. In some embodiments, the logic 22 may also be configured to determine if an availability bypass mode is set, bypass encryption, decryption, and integrity checks if the availability bypass mode is set, and clear indicators of integrity failure for data sent to a processor if the availability bypass mode is set. For example, the logic 22 may be further configured to restore data to the memory location in the availability bypass mode based on the previous data and the cryptographic MAC associated with the previous data. In any of the embodiments herein, the logic 22 may also be configured to identify a request to change a key assignment if the indicator is set to indicate the integrity failure and a pre-determined value is stored along with the indicator, and change the key assignment corresponding to the identified request. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
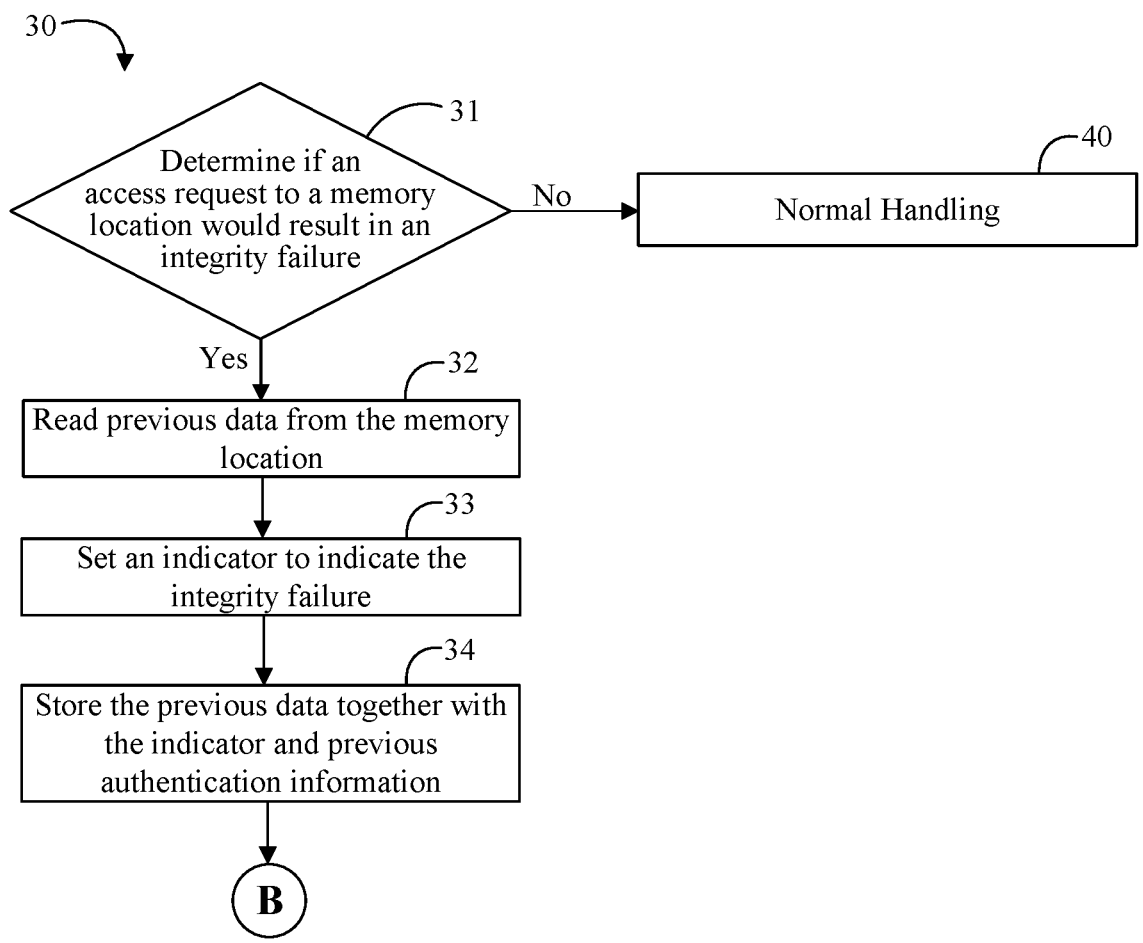
FIGS. 3A to 3C are flowcharts of an example of a method of controlling memory according to an embodiment.
Figures 3B, 3C:
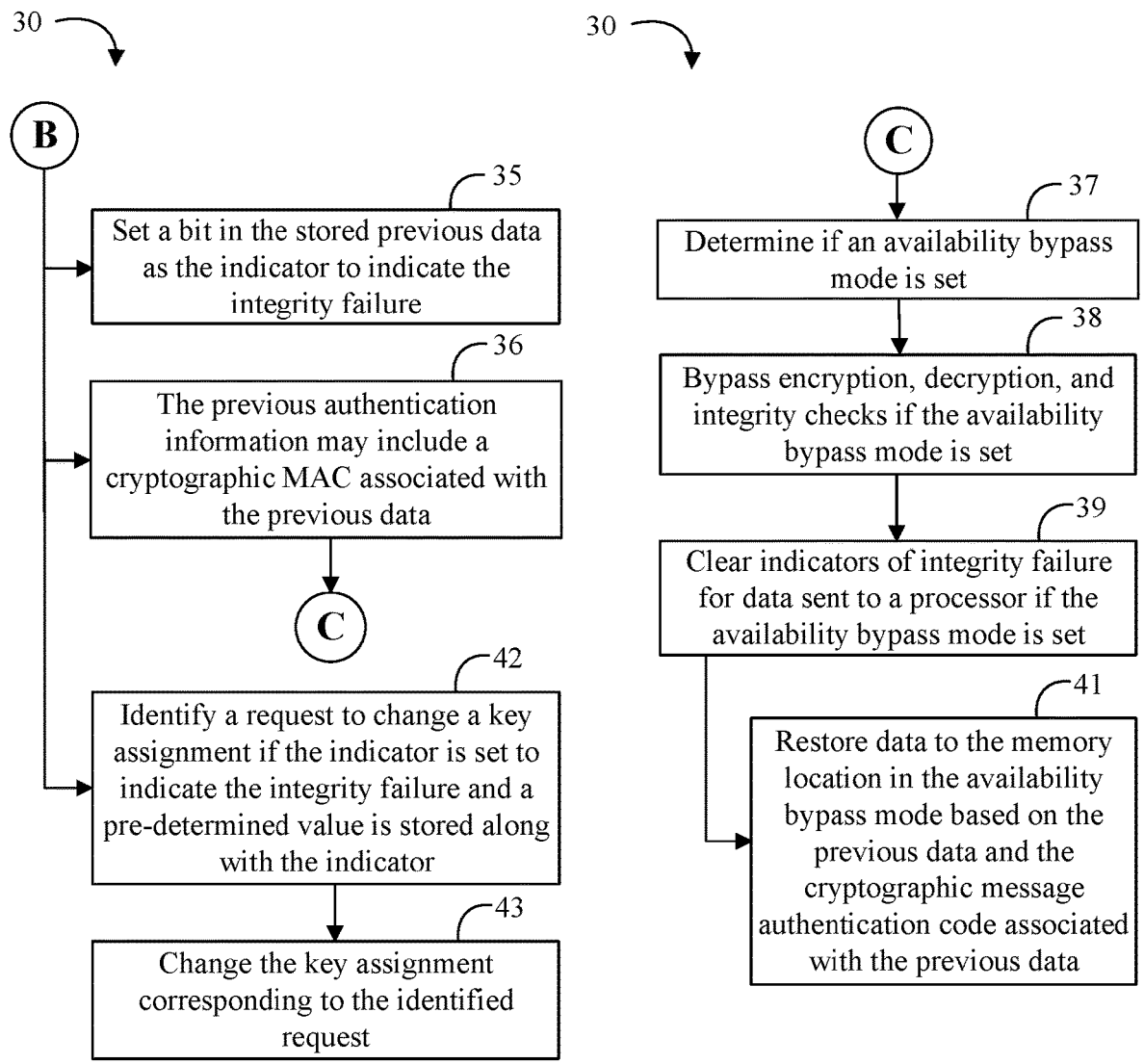

Turning now to FIGS. 3A to 3C, an embodiment of a method 30 of controlling memory may include determining if an access request to a memory location would result in an integrity failure at block 31 and, if so determined, reading previous data from the memory location at block 32, setting an indicator to indicate the integrity failure at block 33, and storing the previous data together with the indicator and previous authentication information at block 34. If the access request is determined to not cause any integrity issues at block 31, the method 30 may proceed to normal handling of the request at block 40.

Some embodiments of the method 30 may include setting a bit in the stored previous data as the indicator to indicate the integrity failure at block 35. For example, the previous authentication information may include a cryptographic MAC associated with the previous data at block 36. Some embodiments of the method 30 may further include determining if an availability bypass mode is set at block 37, bypassing encryption, decryption, and integrity checks if the availability bypass mode is set at block 38, and clearing indicators of integrity failure for data sent to a processor if the availability bypass mode is set at block 39. Some embodiments of the method 30 may also include restoring data to the memory location in the availability bypass mode based on the previous data and the cryptographic MAC associated with the previous data at block 41 (e.g., as described in further detail herein, see method 90 (FIGS. 9A to 9B)). Any embodiments of the method 30 may also include identifying a request to change a key assignment if the indicator is set to indicate the integrity failure and a pre-determined value is stored along with the indicator at block 42, and changing the key assignment corresponding to the identified request at block 43.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 20 to 25 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 4:
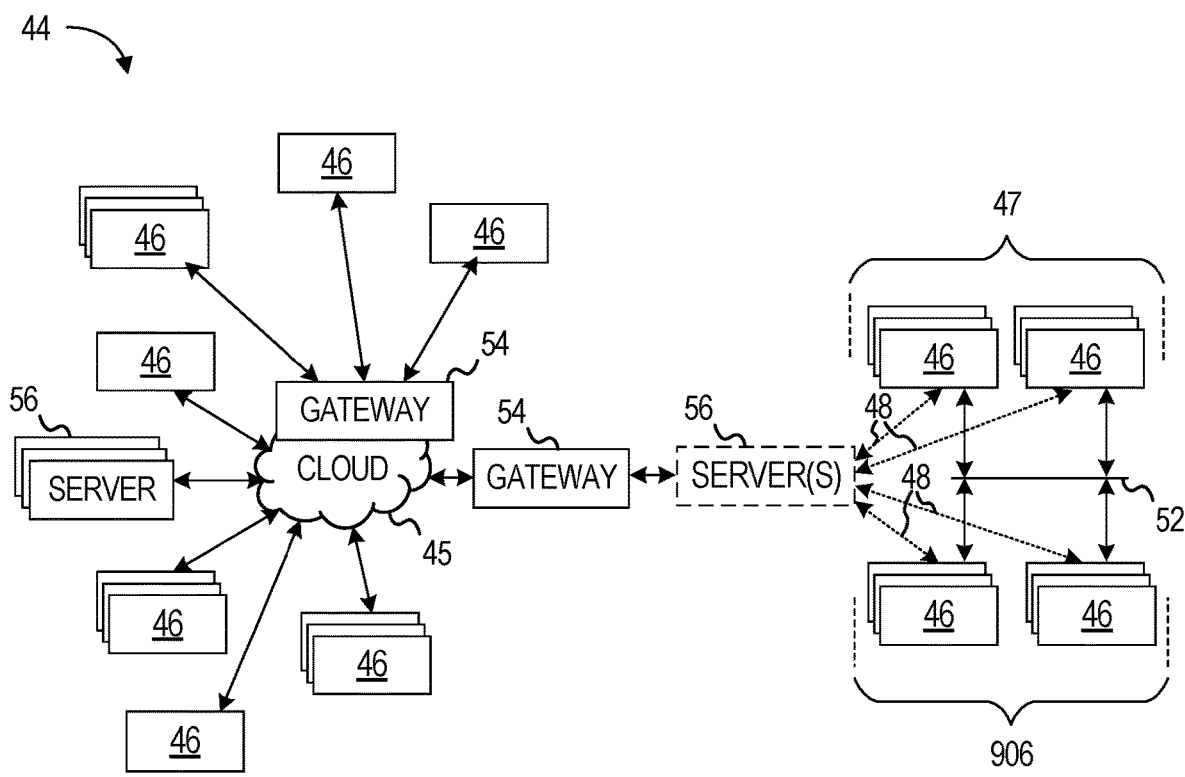
FIG. 4 is a block diagram of an example of distributed computing environment according to an embodiment.

Turning now to FIG. 4, an embodiment of a distributed computing environment 44 may include a cloud computing network, or cloud 45, in communication with a number of client, edge, and/or Internet of Things (IoT) devices 46 (e.g., computers, tablets, smartphones, cameras, sensors, etc.). The cloud 45 may represent the Internet, or may be a local area network (LAN), or a wide area network (WAN), such as a proprietary network for a company. The client/edge/IoT devices 46 may include any number of different types of devices, grouped in various combinations. For example, a control group 47 may include a group of client/edge/IoT devices 46. The control group 47, or other subgroups, may be in communication with the cloud 45 through wired or wireless links 48, such as low-power, wide-area (LPWA) links, optical links, and the like. Further, a wired or wireless sub-network 52 may allow the client/edge/IoT devices 46 to communicate with each other, such as through a local area network, a wireless local area network, and the like. The client/edge/IoT devices 46 may use other devices, such as gateways 54 to communicate with remote locations such as the cloud 45. The client/edge/IoT devices 46 may also use one or more servers 56 to facilitate communication with the cloud 45 or with the gateway(s) 54. For example, the one or more servers 56 may operate as an intermediate network node to support a local edge cloud or fog implementation among a local area network. Further, one or more of the gateways 54 may operate in a cloud-to-gateway-to-many client/edge/IoT devices configuration, such as with some of the illustrated client/edge/IoT devices 46 being constrained or dynamic to an assignment and use of resources in the cloud 45.

As can be seen from FIG. 4, a large number of IoT devices may be communicating through the cloud 45. This may allow different IoT devices to request or provide information to other devices autonomously. For example, a group of IoT devices (e.g., the control group 47) may request a current weather forecast from a group of remote weather stations, which may provide the forecast without human intervention. Further, a device 46 on an emergency vehicle may be alerted by another device 46 associated with an automated teller machine that a burglary is in progress. As the emergency vehicle proceeds towards the automated teller machine, it may access the control group 47 to request clearance to the location, for example, by lights turning red to block cross traffic at an intersection in sufficient time for the emergency vehicle to have unimpeded access to the intersection. Clusters of client/edge/IoT devices, such as the control group 47, may be equipped to communicate with other client/edge/IoT devices 46 as well as with the cloud 45. This may allow the devices 46 to form an ad-hoc network between the devices 46, allowing them to function as a single device, which may be termed a fog device or system.

Most or all of the electronic components in the environment 44 may include memory components which may include data integrity features such as error code correction (ECC), encryption/decryption (e.g., or other authentication information), etc. For example, the client/edge/IoT devices 46, gateways 54, and/or servers 56 all may include memory components. Any of the devices which include memory components and data integrity features may benefit from one or more aspects of the embodiments herein. In accordance with some embodiments, these devices may also include bypass technology to extract potentially damaged data from memory and then restore the data to an undamaged state (e.g., cryptographic MACs in memory may be utilized to determine when the data is correctly restored). For example, one or more of the devices 46, the gateways 54, and the servers 56 may include respective memory controllers with technology to determine if an access request to a memory location would result in an integrity failure, read previous data from the memory location, set an indicator to indicate the integrity failure, and store the previous data together with the indicator and previous authentication information. In some embodiments, the respective memory controllers may be configured to set a bit in the stored previous data as the indicator to indicate the integrity failure. For example, the previous authentication information may include a cryptographic MAC associated with the previous data. In some embodiments, the respective memory controllers may also be configured to determine if an availability bypass mode is set, bypass encryption, decryption, and integrity checks if the availability bypass mode is set, and clear indicators of integrity failure for data sent to a processor if the availability bypass mode is set. For example, software may be configured to restore data to the memory location in the availability bypass mode based on the previous data and the cryptographic MAC associated with the previous data. In any of the embodiments herein, the respective memory controllers may also be configured to identify a request to change a key assignment if the indicator is set to indicate the integrity failure and a pre-determined value is stored along with the indicator, and change the key assignment corresponding to the identified request.

Figure 5:
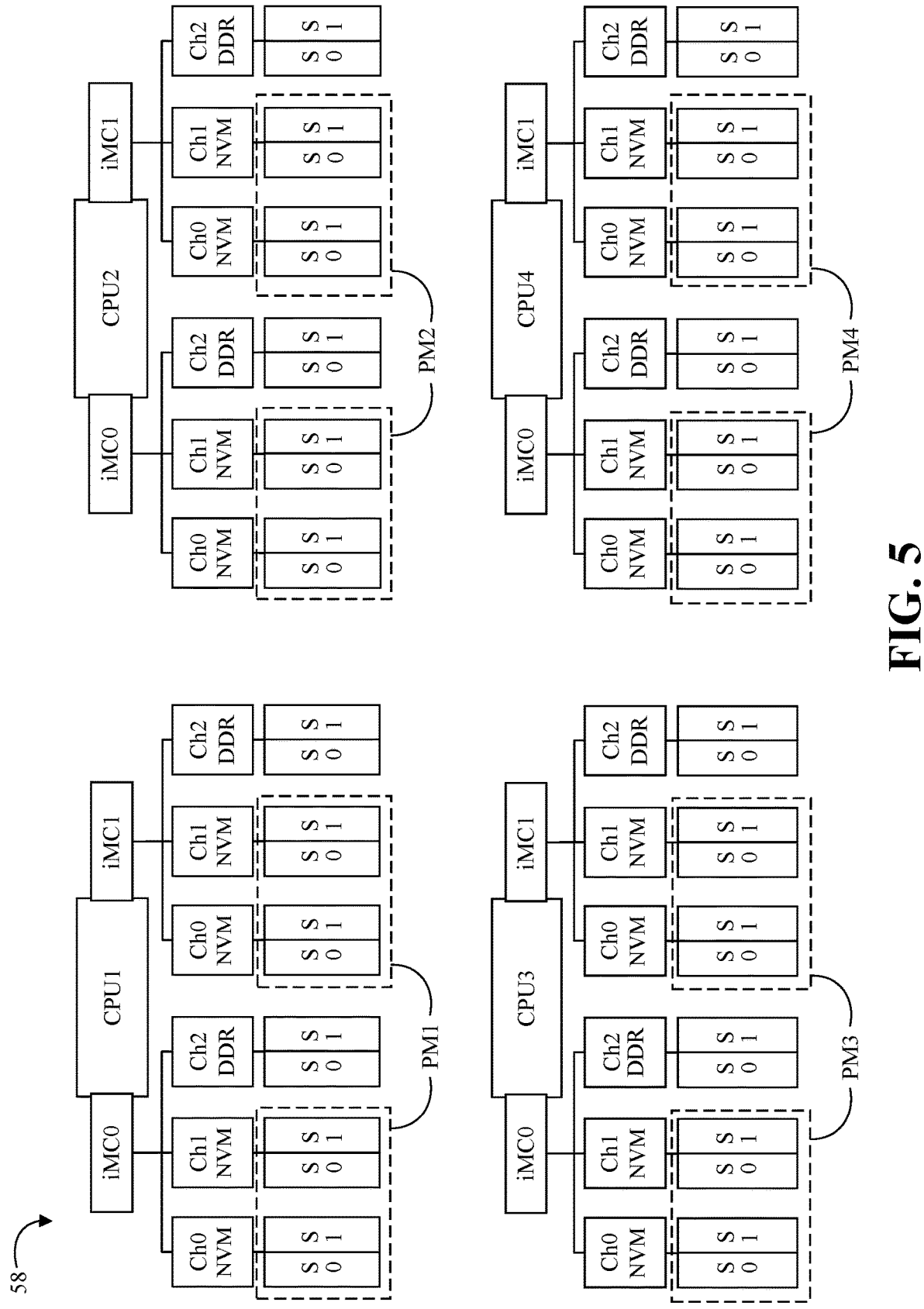
FIG. 5 is a block diagram of another example of an electronic processing system according to an embodiment.

Turning now to FIG. 5, an embodiment of an electronic processing system 58 may include a multiple CPU socket system (e.g., four CPUs including CPU1, CPU2, CPU3, and CPU4), where each CPU has multiple memory controllers (e.g., two integrated memory controllers iMC0 and iMC1), each memory controller has multiple channels (e.g., three channels CH0, CH1 and CH2), and each channel has multiple slots (e.g., two slots S0 and S1) to allow multiple dual-inline memory modules (DIMMs) (e.g., DDR, non-volatile memory (NVM), etc.) with one DIMM installed in each slot. For non-volatile DIMMs (NVDIMMs) in the slots, persistent memory from the NVDIMMs may be interleaved within each CPU for better performance to create different persistent memory regions (e.g., four regions PM1, PM2, PM3, and PM4). These regions may represent persistent memory that is mapped in the system physical address space in which memory accesses from the CPU may be sent to the appropriate NVDIMM based on the address.

To improve RAS for the system 58, one or more (or all) of the memory controllers (e.g., both iMC0 and iMC1 for each of CPU1, CPU2, CPU3, and CPU4) may be configured to include one or more aspects of the embodiments herein. Some embodiments may provide a bypass mechanism to extract potentially damaged data from memory and then restore the data to an undamaged state. Some embodiments may further utilize cryptographic MACs in memory to determine when the data is correctly restored. For example, the memory controllers may include technology to determine if an access request to a memory location would result in an integrity failure, read previous data from the memory location, set an indicator to indicate the integrity failure, and store the previous data together with the indicator and previous authentication information. In some embodiments, the memory controllers may be configured to set a bit in the stored previous data as the indicator to indicate the integrity failure. For example, the previous authentication information may include a cryptographic MAC associated with the previous data. In some embodiments, the memory controllers may also be configured to determine if an availability bypass mode is set, bypass encryption, decryption, and integrity checks if the availability bypass mode is set, and clear indicators of integrity failure for data sent to a processor if the availability bypass mode is set. For example, software may be configured to restore data to the memory location in the availability bypass mode based on the previous data and the cryptographic MAC associated with the previous data. In any of the embodiments herein, the memory controllers may also be configured to identify a request to change a key assignment if the indicator is set to indicate the integrity failure and a pre-determined value is stored along with the indicator, and change the key assignment corresponding to the identified request.

For example, the system 58 may be implemented in a datacenter (e.g., as a server or a component of server) and may include data integrity features including ECC, data encryption/decryption, or other authentication information. ECC may be applied anywhere from a single bit, to a cacheline, and through a full chip failure (e.g., failure of one memory chip of eight memory chips on a DIMM). Advantageously, some embodiments may increase availability beyond ECC. For example, if a memory integrity failure occurs which is uncorrectable and reported as poisoned, some embodiments may allow software to use the multi-key information to restore the data from a previous key. Software may retry to store the previous data together with the previous MAC to remove the poison. Additionally, or alternatively, the software may use the MAC information to revert the data to a good value.

Some embodiments may advantageously improve server reliability and availability by leveraging multi-key total memory encryption (MKTME). Cloud security providers (CSPs) may prefer cryptographic isolation for the customer workloads running on their platform (e.g. to meet a customer requirement). AMD may provide SME and SEV to meet these requirements for some cloud providers. INTEL CORPORATION may provide TRUST DOMAIN EXTENSIONS (TDX) leveraging MKTME to provide isolation on servers. For example, TDX may provide cryptographic isolation for customer workloads in a cloud environment using MKTME.

While TDX provides cryptographic isolation and confidentiality guarantees, some applications may take further precautions to inhibit an attacker with physical access to memory. In order to protect against undetected modification attacks, for example, some applications may include memory integrity protection. However, the integrity support provided may interfere with the reliability and availability of servers. With some implementations of memory integrity, each cacheline in memory may be associated with a cryptographic MAC which may be generated on a write and verified on a read from memory. Decrypted and integrity verified data is returned to the core when the MAC verification succeeds. An attempt to modify a data line resident in memory results in a MAC verification failure on a subsequent read to the data line. In the case where MAC verification fails, the most common (and natural) mechanism utilized may be referred to as poison. Poison may be included as a mechanism on servers to indicate memory failures (e.g., ECC failure). For example, some server systems may include a poison bit meta-data indicator to the cacheline or ECC memory line, where the poison bit may be set to indicate the error condition. In order to prevent the software running on the core from consuming bad data, data may be zeroed and poisoned. The poison indication informs the core that the associated data is corrupted. The core on consuming a poisoned line may result in a machine check exception (MCE) on some server platforms. Recovery may not be guaranteed from a poison error and there is a chance that the processor state may be corrupted and execution cannot continue. Failure to recover may directly affect the availability of the platform, which may be a key requirement for service providers.

Additionally, using the poison mechanism can also result in data loss which might not be acceptable in some scenarios (e.g., a financial database storing customer transactions). In such cases, there may be a requirement to protect data from getting corrupted even if what is retained is an older snapshot. For example, there may be a case where modified data in core caches gets poisoned (e.g., cache ECC failure on a modified line). In this case, when the poisoned line is evicted out to the memory subsystem, it may result in corruption of a previous correct version of data that can be used for recovery. As another example, the data in memory could be accessed with an incorrect key (either maliciously or otherwise) due to a bug and then get written out (partially or fully) with the incorrect key. In this case, the underfill read to fetch the line from memory with the incorrect key will result in an integrity failure and data will be zeroed, poisoned and written back to memory, thereby losing good data that was present in memory. This becomes problematic particularly for data corruption detection usages where the intent is to catch bugs without corrupting data. The use of an incorrect key could be due to a program bug and instead of losing the data, it may be preferable to preserve the previous data with an indication that there was an attempt to access it incorrectly. Accordingly, the use of integrity can be at odds with the reliability of the system (e.g., as well as availability). Some embodiments may advantageously provide an availability bypass mode to extract potentially damaged data from memory and then restore the data to an undamaged state. In the availability bypass mode, some embodiments may utilize cryptographic MACs in memory to determine when the data is correctly restored.

Advantageously, some embodiments may provide improved reliability and availability for an electronic system with memory integrity. For example, some embodiments may provide data preserving poisoned writes and/or an availability enhancing bypass mode as modifications to an MKTME engine under software control to provide the reliability and availability improvements. Some embodiments may provide a secure server with high reliability and availability. Some embodiments may modify the MKTME engine to provide data preserving poisoned writes which allow a previous version of the data to be retained in memory even in the face of poisoned writes, thereby allowing for software recoverability of data. Such data recovery may be important for numerous applications (e.g., financial databases where a poisoned write must not result in losing customers' transaction history, etc.). Some embodiments may also provide an availability enhancing bypass mode in the MKTME engine. In the availability bypass mode, decryption may be bypassed and integrity checks may be bypassed as well. For both modifications, a poison data indication is not returned to the core, but the data stored in memory (e.g., possibly ciphertext) is returned to the processor core that is loading the memory via the bypass mechanism. The availability bypass mode allows system software to read/recover data in the face of integrity errors without risking corrupting the processor state and impacting availability. In some embodiments, the modifications of the MKTME engine may be under software control and do not weaken the security guarantees of the system while advantageously improving the reliability and availability of the system.

Data Preserving Poisoned Writes Examples

As noted above, some embodiments may provide data preserving poisoned writes. With data preserving poisoned writes, a poisoned write received from the core does not overwrite the data in memory. Instead the data version present in memory is preserved and a poison indication is set to indicate that the data is different from what was intended to be written by software. For example, this poison indicator may be stored with the ECC memory associated with the data line stored in memory. In order to support this feature, a write request received with a poison indication may be treated similar to a partial write flow where a read is issued for the data line to memory. The data line read from memory is poisoned (e.g., by setting the poison bit in ECC memory) and the original data line, MAC, and poison bit set are written back to memory. The new data received from the core is dropped. Dropping the new data ensures that a wrong write can never corrupt data and the original correct data and associated MAC are preserved in memory. Some embodiments may store the new data in a separate region in memory to be used for later analysis and/or recovery.

Figure 6:
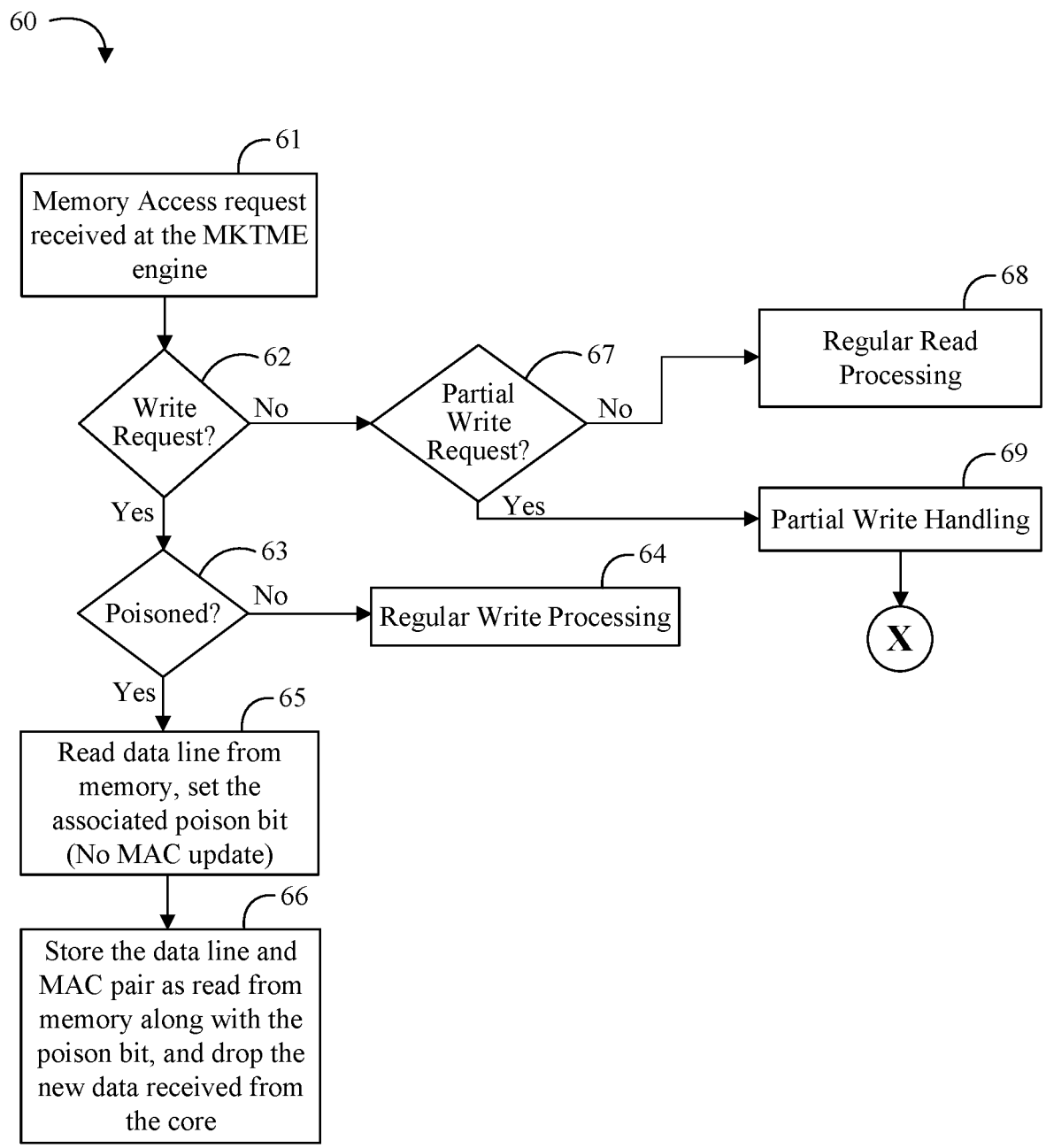
FIG. 6 is a flowchart of an example of a method of preserving data for a poison write according to an embodiment.

Turning now to FIG. 6, an embodiment of a method 60 of preserving data for a poison write may include receiving a memory access request at a MKTME engine at block 61, and determining if the request corresponds to a write request at block 62 (e.g., a store operation). If the request corresponds to write request at block 62, the method 60 may then determine if the write request is poisoned at block 63. If the write request is not poisoned, the method 60 may process the write request as a regular write at block 64. If the write request is poisoned, the method 60 may include reading a data line from memory (e.g., corresponding to the write request), setting an associated poison bit, and not updating the MAC at block 65 (e.g., retaining the previous MAC). The method 60 may then include storing the data line and MAC pair as read from memory along with the poison bit, and dropping the new data received from the core at block 66. As noted above, some embodiments of the method 60 may further include storing the new data in a separate region in memory to be used for later analysis and/or recovery.

If the memory access request is not a write request at block 62, the method 60 may include determining if the memory access request corresponds to a partial write request at block 67. If not, the method 60 may include processing the memory access request as a regular read access request at block 68. Otherwise, the method may proceed to handling the partial write request at block 69 (e.g., following the method 70 from FIG. 7).

A partial write on encrypted memory may be handled as a read-modify-write operation. The encrypted cacheline is read from memory (also known as an underfill read), decrypted, partial data is merged, and finally the merged cacheline is encrypted and written to memory. Sometimes the underfill read may result in an integrity failure. In some systems, such a partial write will cause the data to be zeroed and written to memory with a poison (in which case the data may be lost). For usages such as data corruption detection using integrity, such a scenario may happen frequently due to bugs in the program code resulting in memory being accessed with an incorrect key. Some embodiments may provide data preserving partial poison writes that do not lose the data that is in memory. Similar to the data preserving poison writes described herein, if the underfill read would result in an integrity failure, the partial write and new data received from the core is dropped. The MKTME engine sets the poison bit for the data read from memory and stores the original data and MAC pair in memory ensuring that a bad partial write (possibly due to the use of wrong key) cannot corrupt data in memory.

Figure 7:
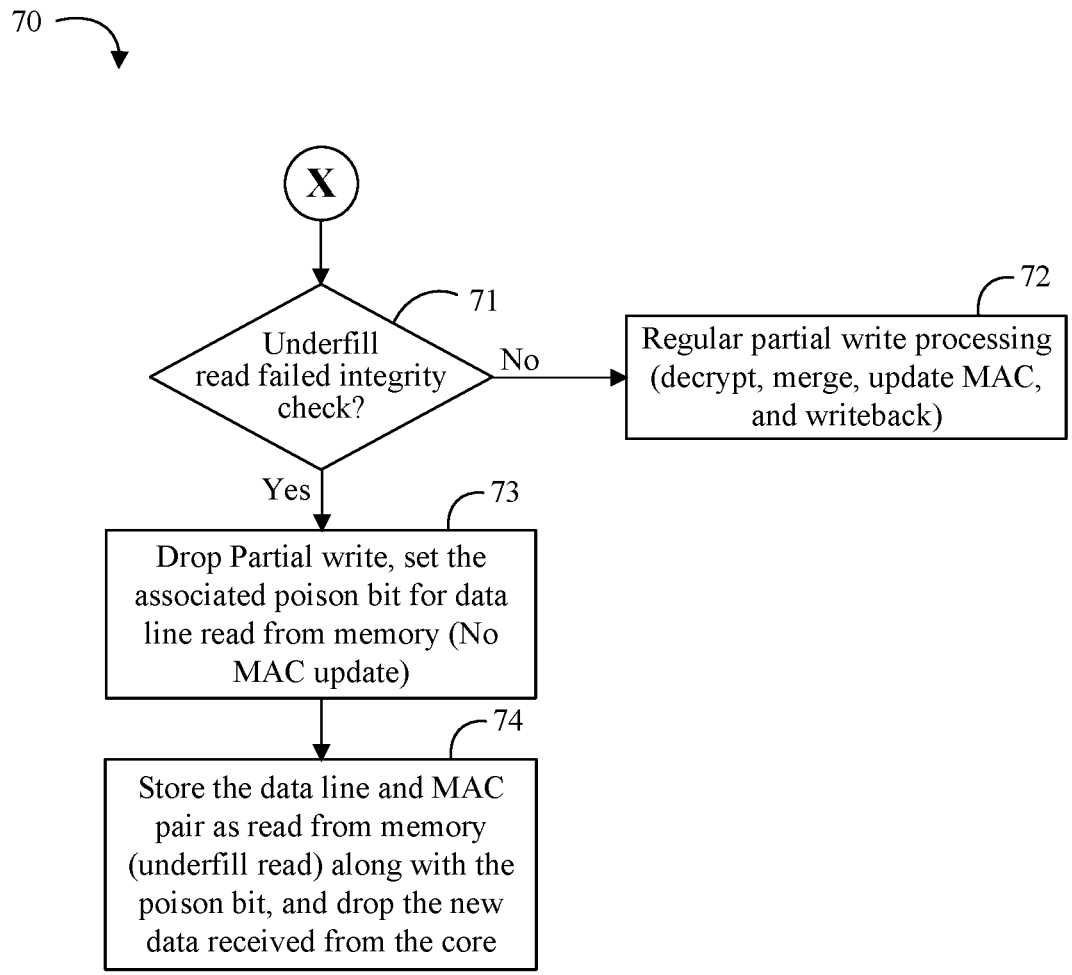
FIG. 7 is a flowchart of an example of a method of preserving data for a partial poison write according to an embodiment.

Turning now to FIG. 7, an embodiment of a method 70 of preserving data for partial poison writes may include determining if an underfill read fails an integrity check at block 71. If not, the method 70 may include processing the partial write request as a regular partial write request at block 72 (e.g., including decrypting, merging, updating the MAC, and writing the data back). For a failed integrity check, the method 70 may include dropping the partial write, setting the associated poison bit for the corresponding data line read from memory, and not updating the MAC at block 73 (e.g., retaining the previous MAC). The method 70 may then include storing the data line and MAC pair as read from memory (e.g., the underfill read) along with the poison bit (e.g., by storing the poison bit in ECC memory), and dropping the new data received from the core at block 74. Some embodiments of the method 70 may further include storing the new data in a separate region in memory to be used for later analysis and/or recovery.

Availability Enhancing Bypass Examples

Some MKTME engines may support a bypass mode where no encryption/decryption is performed and integrity checks are bypassed. Other embodiments may support encryption/decryption but ignore integrity errors when bypass is used. Some embodiments may support an integrity only mode where encryption/decryption is not used and the MAC is computed over the plaintext data. On a read to memory with the bypass mode set, however, if poisoned data is read the poison is returned back to the core which can result in bringing the machine down if the poison consumption corrupts the processor state beyond repair. Some embodiments may advantageously provide an availability enhancing bypass mode to allow system software to read data from memory to perform recovery operations. In the availability bypass mode, in addition to bypassing the encryption/decryption and/or integrity checking, the poison indication is not sent to the core, thereby preventing software from consuming poison and potentially bringing the machine down. The availability bypass mode is not intended to be used for regular operation but for recovery modes where system software is trying to recover data from memory in the event where there is some data corruption.

Figure 8:
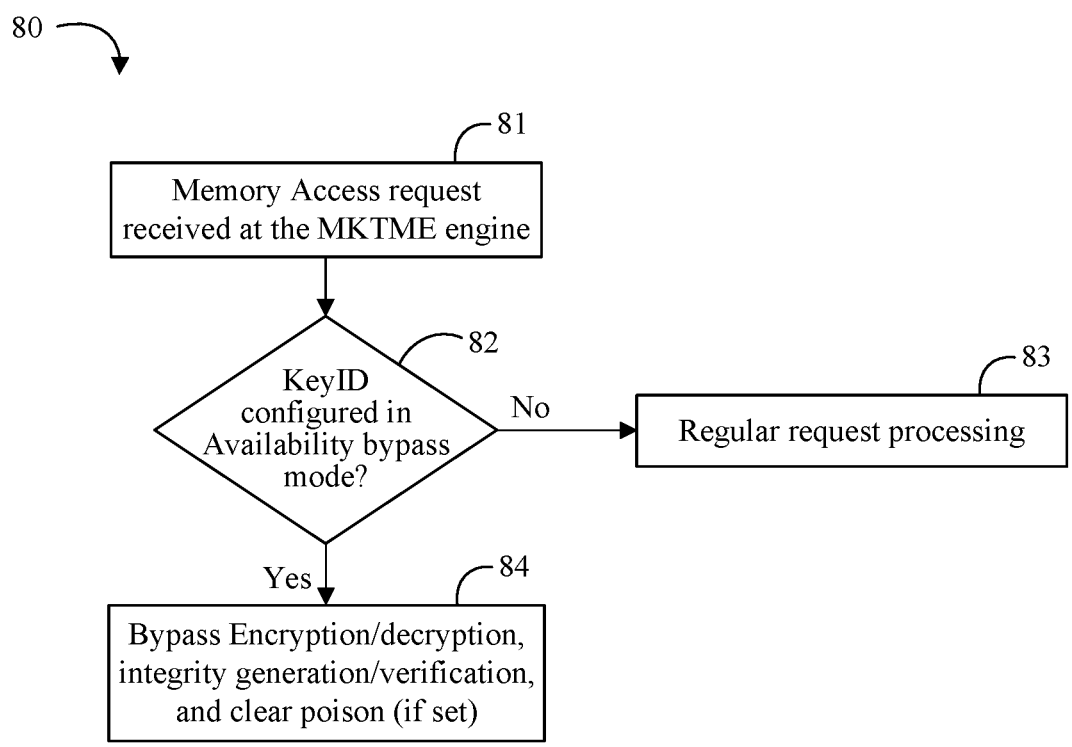
FIG. 8 is a flowchart of an example of a method of handling a bypass mode with enhanced availability according to an embodiment.

Turning now to FIG. 8, an embodiment of a method 80 of handling a bypass mode with enhanced availability may include receiving a memory access request at a MKTME engine at block 81, and determining if a key identifier (KeyID) is configured in an availability bypass mode at block 82. If not, the method 80 may including processing the memory access request as a regular request at block 83. Otherwise, in the availability bypass mode, the method 80 may include bypassing encryption/decryption, bypassing integrity generation/verification, and clearing any poison indication (if set) at block 84. Some embodiments may have separate indications for poison to distinguish ECC uncorrectable errors verses integrity errors. For example, there may be a poison bit and a separate integrity error bit, or separate error codes for each.

Figure 9A:
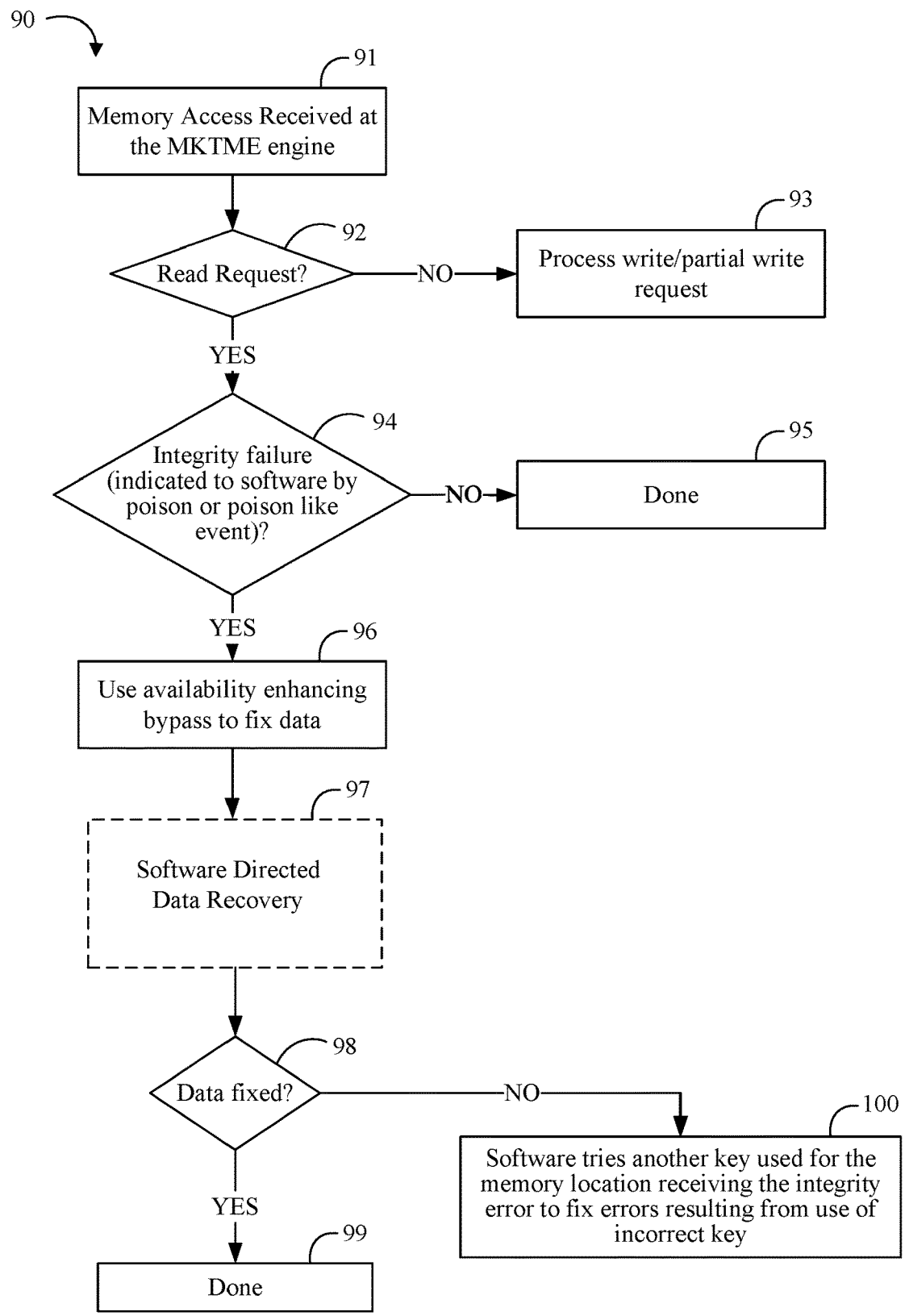
FIGS. 9A to 9B are flowcharts of an example of a method of restoring data according to an embodiment.
Figure 9B:
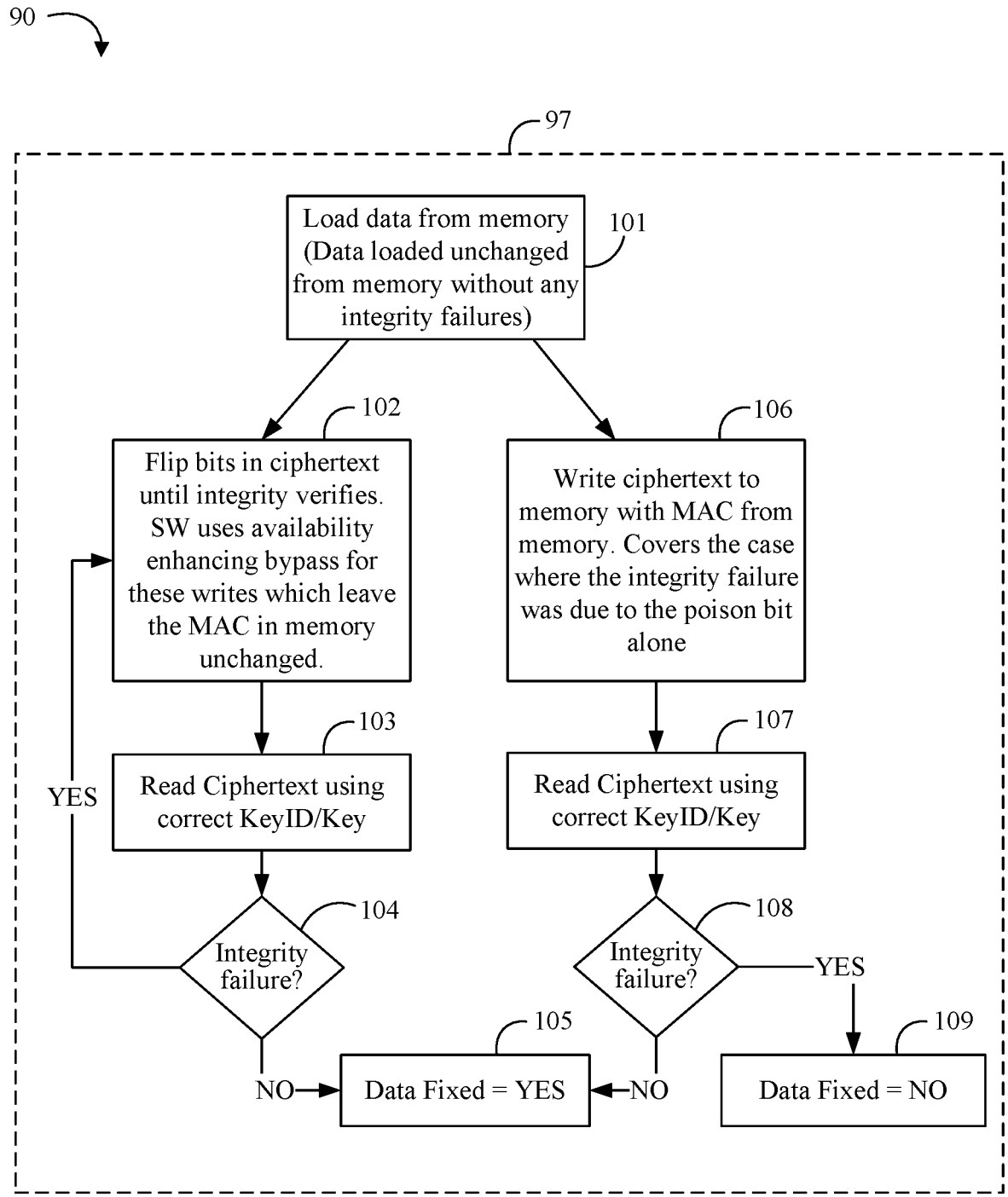

Turning now to FIGS. 9A to 9B, an embodiment of method 90 of recovering data may include receiving a memory access request at the MKTME engine at block 91, and determining if the memory access request is a read request at block 92. If not, the method 90 may proceed to processing a write/partial write request at block 93 (e.g., following the method 60 (FIG. 6) or the method 70 (FIG. 7), respectively). Otherwise, the method 90 may proceed to determining if the read request involves an integrity failure at block 94 (e.g., indicated to software by poison or a poison-like event). If not, the method 90 may be done at block 95 (e.g., no data recovery needed). Otherwise, the method 90 may proceed to using the availability enhancing bypass to fix the data at block 96. The method 90 may then include recovering the data as directed by the software at block 97 (e.g., see FIG. 9B for example details), and determining if the data is fixed at block 98. If so, the method 90 may be done at block 99. Otherwise, at block 100, the method 90 may include the software trying another key used for the memory location receiving the integrity error to fix errors resulting from the use of the incorrect key.

The software may use any suitable technology and/or techniques to restore the data, in accordance with the type of data, the encryption applied, software maintained backups of the data, etc. Advantageously, some embodiments may provide the availability bypass mode which may allow the software to clear some integrity errors using the previously stored data and MAC pair. On an availability bypass memory read (e.g., load) the prior data is read from memory without triggering any error indications (so that it may be recovered). On an availability bypass memory write (e.g., store) the prior MAC is read from memory (e.g., recovered) and this prior MAC is written back to memory along with the repaired data (e.g., ciphertext) provided by the processor/software. For example, the method 90 may include loading data from memory at block 101 (e.g., data may be loaded unchanged from memory without any integrity failures). The method 90 may then include the software choosing any appropriate technique to restore the data. In one example, the method 90 may include flipping bits in the ciphertext until the integrity verifies at block 102. The software may use the availability enhancing bypass for these writes which leave the MAC in memory unchanged. The method 90 may then include reading the ciphertext using the correct KeyID/Key at block 103, and determining if there is an integrity failure at block 104. If not, the data may be indicated as fixed at block 105. Otherwise, the method may return to block 102 to flip different bits in the ciphertext (e.g., the flipping may continue until all bits have been flipped or until some predetermined number of attempts).

In another example that the software may try to recover the data, the method 90 may include writing the ciphertext to memory with the MAC from memory at block 107 (e.g., the MAC may be stored in ECC memory or in a separate table). This example may cover the case where the integrity failure was due to the poison bit alone. The method 90 may then include reading the ciphertext using the correct KeyID/Key at block 107, and determining if there is an integrity failure at block 108. If not, the data may be indicated as fixed at block 105. Otherwise, the data may be indicated as not fixed at block 109.

The availability bypass mode may be enabled by software and may require or benefit from a capability for the software to program a KeyID in the bypass availability mode. For example, some MKTME engines may support a PCONFIG instruction. The PCONFIG instruction may be invoked by software for managing the keys/protection for a domain using the MK-TME engine. PCONFIG may support multiple leafs and a leaf function may be invoked by setting the appropriate leaf value in a general-purpose register (GPR) such as EAX. For example, RBX, RCX, and RDX may each have a leaf-specific purpose. PCONFIG may support a leaf, KEY_PROGRAM, which may be used to manage the key associated with a domain. The KEY_PROGRAM operation works using the KEY_PROGRAM_STRUCT.

Figure 10A:
FIG. 10A is an illustrative diagram of a table of a key programming structure according to an embodiment.

Turning now to FIG. 10A, an embodiment of an illustrative table 110 shows an example of a KEY_PROGRAM_STRUCT in memory used by a PCONIFG instruction to bind a key to a KeyID.

Some embodiments of a MKTME engine may support the availability bypass mode corresponding to an availability bypass command. For example, the availability bypass mode may be set by a new command referred to in some embodiments as KEYID_AVAILABILITY_BYPASS. When a KeyID is set in the availability bypass mode, the MKTME engine may bypass encryption/decryption, bypass integrity, and clear poison indications (e.g., following the method 80 (FIG. 8)).

Turning now to FIG. 10B, an embodiment of an illustrative table 112 shows an example of commands that may be used by software to control the behavior of a key domain (e.g., including a KEYID_AVAILABILITY_BYPASS).

Data Recovery Examples

Notifications of error, poison, etc., for example, may be reported to privileged software as exceptions (e.g., a machine check error (MCE)). An example of a server with memory integrity features (e.g., poison) includes those utilizing the INTEL XEON PLATINUM and/or INTEL XEON GOLD processors. Some embodiments described herein may be used by software to recover original data to prevent data loss. As an example, software on getting the notification of poisoning (e.g., received using a machine check interrupt that is raised on an integrity failure) may use the availability enhancing bypass mode to read poisoned data from memory.

The availability bypass will return the ciphertext that is stored in memory (e.g., bypassing the MAC check and dropping the poison) to the software. The software can write the data back to memory using the bypass which will not update the MAC but will clear the poison associated with the data line. The software may use the original MAC to verify the original data before writing the data back to memory. For example, if the memory integrity error was caused by the wrong key being programmed into the MKTME engine, software can use PCONFIG to reprogram the key and attempt to read the data again. If needed, the software may update the data and corresponding MAC before writing the data back to memory. For example, if the data was corrupted due to a bit error or errors, the software may try writing back the ciphertext back to memory repeatedly using the bypass mechanism, flipping different bit combinations each time, and then reading the memory back again using the current KeyID/key until the integrity check succeeds and the data is deemed corrected or software gives up due to too many failed attempts and deems the memory contents uncorrectable. This will ensure that the owning software can now read the data correctly with the right key without any integrity failures. Advantageously, the availability bypass mode may still prevent software replay attacks because the original MAC for the original data persists once corrected (e.g., where only software that owns the key is allowed to update the MAC by writing to memory). In the availability bypass mode, the software may use any suitable technology to fix problems (e.g., uncorrectable ECC errors) with the original data based on the MAC (e.g. or other authentication information). If there was a real ECC uncorrectable error on the data, for example, with the availability bypass mode set the software has an opportunity to flip bits in the ciphertext until it finds one that passes the original MAC. In the case the MAC itself was corrupted in memory, the software that owns the key may write back the original/correct data to memory and, thus, correct the corrupted MAC on a direct write operation (e.g. using the MOVNT instruction), or otherwise causing a memory write without a preceding read.

Some embodiments may provide a hyper-conservative mode where every memory write is proceeded by a read to assure the KeyID for the MAC is unchanged (e.g., the same key that was used on the data stored in memory as is being used to overwrite the data in memory on the write operation, as determined by the MAC verification with the key specified via the KeyID) or the new data with the write is not written to memory, just the poison bit is updated. The hyper-conservative mode may have a performance hit, but may be beneficial for applications that want to assure data cannot be corrupted with a wrong write.

Some embodiments of a MKTME engine may support a key re-assignment instruction, KEYREASSIGN, to change the KeyID to allow page key re-assignment. The KEYREASSIGN instruction may (1) set poison on a cacheline; and (2) write a special data value to memory. The MKTME with integrity engine will then see the poison indication (e.g., directly set by the instruction microcode flow), and read the special data value (e.g., xDEADBEEFFEEDFACECAFEBEEF) to indicate this is actually the special flow for initializing memory to the new KeyID. The MKTME engine may then encrypt zeros and reset the MAC for the KeyID specified in the physical address. Other embodiments may use another bit indicator or code similar to poison to indicate to the MKTME engine that the current write is special and is initializing memory with the new KeyID via the key reassignment instruction.

Some embodiments may provide improved reliability and availability enhancements. Advantageously, these enhancements do not impact the security of the system. As an example, the availability bypass mode does not leak data in any way or allow software a way to corrupt data. The availability bypass mode simply allows software to read poisoned data from memory without the risk of bringing the machine down. The software will have access to ciphertext, but that might be needed in some cases to allow privileged software to do resource management or data recovery.

Figure 11:
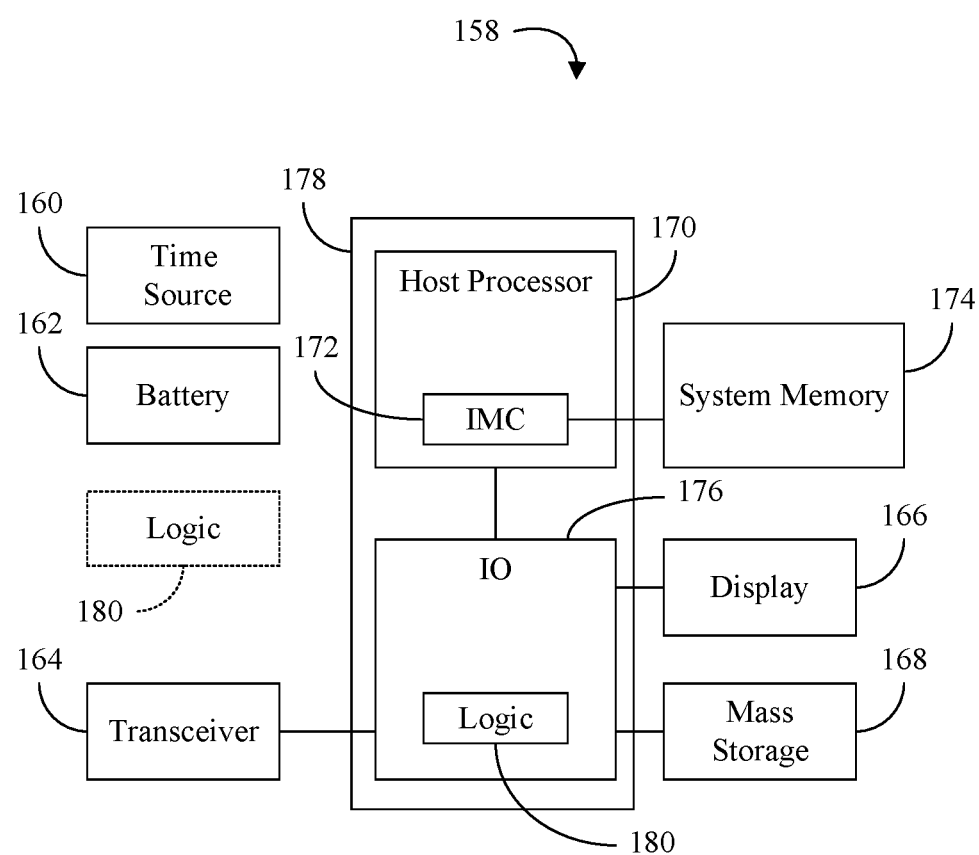
FIG. 11 is a block diagram of an example of a computing device according to an embodiment.

FIG. 11 shows a computing device 158 that may be readily incorporated in or substituted for one or more of the electronic processing system 10 (FIG. 1), the apparatus 20 (FIG. 2), the electronic components of environment 44 (FIG. 4), and/or the system 58 (FIG. 5), already discussed. In the illustrated example, the device 158 includes a time source 160 (e.g., crystal oscillator, clock), a battery 162 to supply power to the device 158, a transceiver 164 (e.g., wireless or wired), a display 166 and mass storage 168 (e.g., hard disk drive/HDD, solid state disk/SSD, optical disk, flash memory). The device 158 may also include a host processor 170 (e.g., CPU) having an integrated memory controller (IMC) 172, which may communicate with system memory 174. The system memory 174 may include, for example, dynamic random access memory (DRAM) configured as one or more memory modules such as, for example, dual inline memory modules (DIMMs), small outline DIMMs (SODIMMs), etc. The illustrated device 158 also includes an input output (IO) module 176 implemented together with the processor 170 on a semiconductor die 178 as a system on chip (SoC), wherein the IO module 176 functions as a host device and may communicate with, for example, the display 166, the transceiver 164, the mass storage 168, and so forth. The mass storage 168 may include non-volatile memory (NVM) that stores one or more keys (e.g., MAC generation keys, encryption keys).

The IO module 176 may include logic 180 that causes the semiconductor die 178 to operate as a memory controller such as, for example, electronic processing system 10 (FIG. 1), the apparatus 20, and/or the memory controllers of the system 58 (FIG. 5). Thus, the logic 180 may determine if an access request to a memory location would result in an integrity failure and, if so determined, read previous data from the memory location, set an indicator to indicate the integrity failure, and store the previous data together with the indicator and previous authentication information. In some embodiments, the logic 180 may be configured to set a bit in the stored previous data as the indicator to indicate the integrity failure. For example, the previous authentication information may include a cryptographic MAC associated with the previous data. In some embodiments, the logic 180 may also be configured to determine if an availability bypass mode is set, bypass encryption, decryption, and integrity checks if the availability bypass mode is set, and clear indicators of integrity failure for data sent to a processor if the availability bypass mode is set. For example, the logic 180 may be further configured to restore data to the memory location in the availability bypass mode based on the previous data and the cryptographic MAC associated with the previous data. In any of the embodiments herein, the logic 180 may also be configured to identify a request to change a key assignment if the indicator is set to indicate the integrity failure and a pre-determined value is stored along with the indicator, and change the key assignment corresponding to the identified request. In one example, the time source 160 is autonomous/independent from the controller in order to enhance security (e.g., to prevent the controller from tampering with cadence, frequency, latency and/or timestamp data). The logic 180 may also be implemented elsewhere in the device 158.

Figure 12:
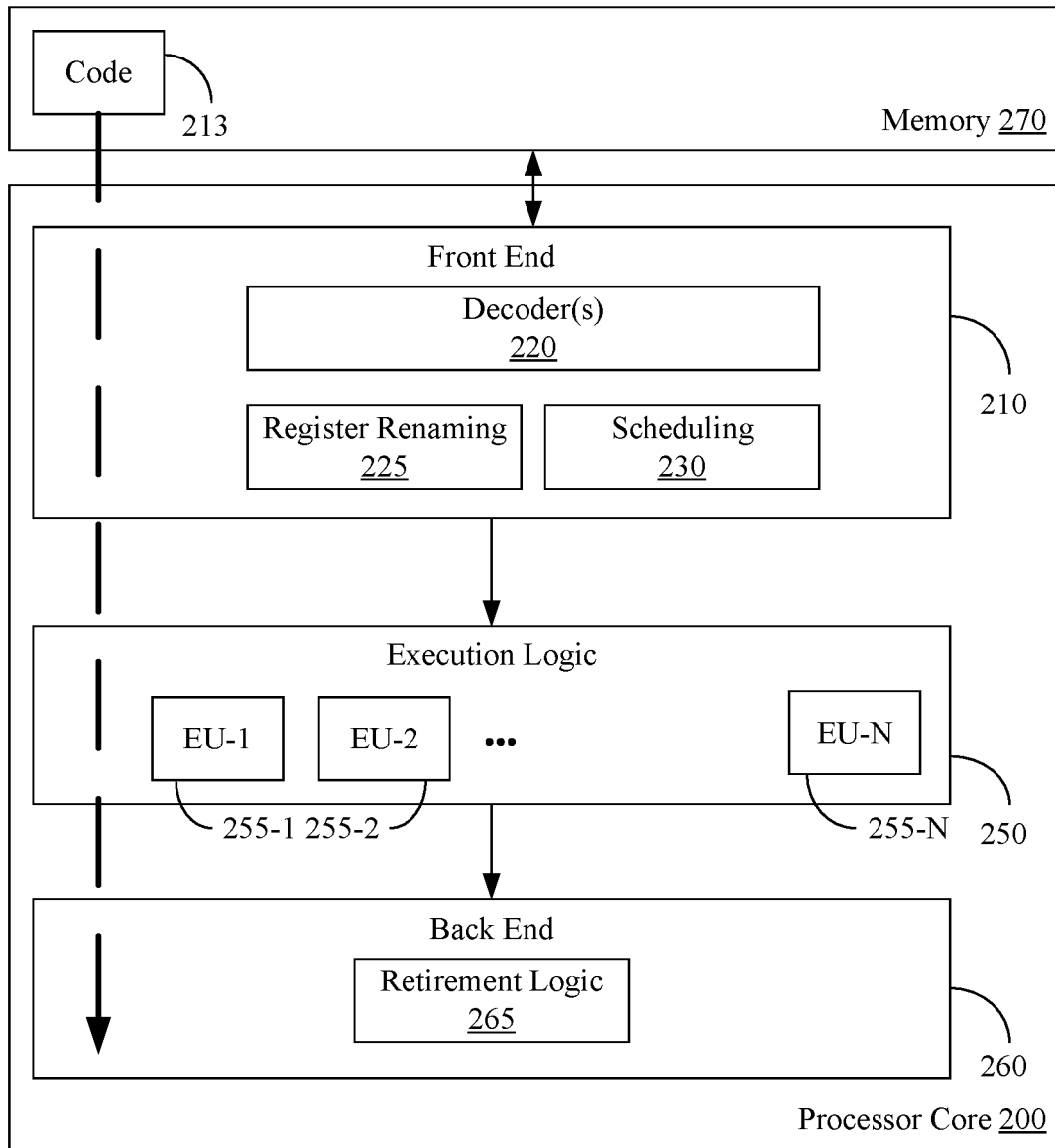
FIG. 12 is a block diagram of an example of a processor according to an embodiment.

FIG. 12 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 12, a processing element may alternatively include more than one of the processor core 200 illustrated in FIG. 12. The processor core 200 may be a single-threaded core or, for at least one embodiment, the processor core 200 may be multithreaded in that it may include more than one hardware thread context (or "logical processor") per core.

FIG. 12 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 30 (FIGS. 3A to 3C), the method 60 (FIG. 6), the method 70 (FIG. 7), and/or the method 80 (FIG. 8), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 12, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 13, shown is a block diagram of a computing system 1000 embodiment in accordance with an embodiment. Shown in FIG. 13 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 13 may be implemented as a multi-drop bus rather than point-to-point interconnect.

As shown in FIG. 13, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 12.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 13, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 13, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 13, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 30 (FIGS. 3A to 3C), the method 60 (FIG. 6), the method 70 (FIG. 7), and/or the method 80 (FIG. 8), already discussed, and may be similar to the code 213 (FIG. 12), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 13, a system may implement a multi-drop bus or another such communication topology. Also, the elements of FIG. 13 may alternatively be partitioned using more or fewer integrated chips than shown in FIG. 13.

Additional Notes and Examples:

Example 1 may include an electronic processing system, comprising a processor, memory communicatively coupled to the processor, and logic communicatively coupled to the processor and the memory to determine if an access request to a memory location of the memory would result in an integrity failure and, if so determined, read previous data from the memory location, set an indicator to indicate the integrity failure, and store the previous data together with the indicator and previous authentication information.

Example 2 may include the system of Example 1, wherein the logic is further to set a bit in the stored previous data as the indicator to indicate the integrity failure.

Example 3 may include the system of Example 1, wherein the previous authentication information includes a cryptographic MAC associated with the previous data.

Example 4 may include the system of Example 3, wherein the logic is further to determine if an availability bypass mode is set, bypass encryption, decryption, and integrity checks if the availability bypass mode is set, and clear indicators of integrity failure for data sent to the processor if the availability bypass mode is set.

Example 5 may include the system of Example 4, wherein the logic is further to restore data to the memory location in the availability bypass mode based on the previous data and the cryptographic MAC associated with the previous data.

Example 6 may include the system of any of Examples 1 to 5, wherein the logic is further to identify a request to change a key assignment if the indicator is set to indicate the integrity failure and a pre-determined value is stored along with the indicator, and change the key assignment corresponding to the identified request.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to determine if an access request to a memory location would result in an integrity failure and, if so determined, read previous data from the memory location, set an indicator to indicate the integrity failure, and store the previous data together with the indicator and previous authentication information.

Example 8 may include the apparatus of Example 7, wherein the logic is further to set a bit in the stored previous data as the indicator to indicate the integrity failure.

Example 9 may include the apparatus of Example 7, wherein the previous authentication information includes a cryptographic MAC associated with the previous data.

Example 10 may include the apparatus of Example 9, wherein the logic is further to determine if an availability bypass mode is set, bypass encryption, decryption, and integrity checks if the availability bypass mode is set, and clear indicators of integrity failure for data sent to a processor if the availability bypass mode is set.

Example 11 may include the apparatus of Example 10, wherein the logic is further to restore data to the memory location in the availability bypass mode based on the previous data and the cryptographic MAC associated with the previous data.

Example 12 may include the apparatus of any of Examples 7 to 11, wherein the logic is further to identify a request to change a key assignment if the indicator is set to indicate the integrity failure and a pre-determined value is stored along with the indicator, and change the key assignment corresponding to the identified request.

Example 13 may include the apparatus of any of Examples 7 to 12, wherein the logic coupled to the one or more substrates includes transistor channel regions that are positioned within the one or more substrates.

Example 14 may include a method of controlling memory, comprising determining if an access request to a memory location would result in an integrity failure and, if so determined, reading previous data from the memory location, setting an indicator to indicate the integrity failure, and storing the previous data together with the indicator and previous authentication information.

Example 15 may include the method of Example 14, further comprising setting a bit in the stored previous data as the indicator to indicate the integrity failure.

Example 16 may include the method of Example 14, wherein the previous authentication information includes a cryptographic MAC associated with the previous data.

Example 17 may include the method of Example 16, further comprising determining if an availability bypass mode is set, bypassing encryption, decryption, and integrity checks if the availability bypass mode is set, and clearing indicators of integrity failure for data sent to a processor if the availability bypass mode is set.

Example 18 may include the method of Example 17, further comprising restoring data to the memory location in the availability bypass mode based on the previous data and the cryptographic MAC associated with the previous data.

Example 19 may include the method of any of Examples 14 to 18, further comprising identifying a request to change a key assignment if the indicator is set to indicate the integrity failure and a pre-determined value is stored along with the indicator, and changing the key assignment corresponding to the identified request.

Example 20 may include at least one computer readable storage medium, comprising a set of instructions, which when executed by a computing device, cause the computing device to determine if an access request to a memory location would result in an integrity failure and, if so determined, read previous data from the memory location, set an indicator to indicate the integrity failure, and store the previous data together with the indicator and previous authentication information.

Example 21 may include the at least one computer readable storage medium of Example 20, comprising a further set of instructions, which when executed by the computing device, cause the computing device to set a bit in the stored previous data as the indicator to indicate the integrity failure.

Example 22 may include the at least one computer readable storage medium of Example 21, wherein the previous authentication information includes a cryptographic MAC associated with the previous data.

Example 23 may include the at least one computer readable storage medium of Example 22, comprising a further set of instructions, which when executed by the computing device, cause the computing device to determine if an availability bypass mode is set, bypass encryption, decryption, and integrity checks if the availability bypass mode is set, and clear indicators of integrity failure for data sent to a processor if the availability bypass mode is set.

Example 24 may include the at least one computer readable storage medium of Example 23, comprising a further set of instructions, which when executed by the computing device, cause the computing device to restore data to the memory location in the availability bypass mode based on the previous data and the cryptographic MAC associated with the previous data.

Example 25 may include the at least one computer readable storage medium of any of Examples 20 to 24, comprising a further set of instructions, which when executed by the computing device, cause the computing device to identify a request to change a key assignment if the indicator is set to indicate the integrity failure and a pre-determined value is stored along with the indicator, and change the key assignment corresponding to the identified request.

Example 26 may include a memory controller apparatus, comprising means for determining if an access request to a memory location would result in an integrity failure, means for reading previous data from the memory location if the access request is determined to result in the integrity failure, means for setting an indicator to indicate the integrity failure if the access request is determined to result in the integrity failure, and means for storing the previous data together with the indicator and previous authentication information if the access request is determined to result in the integrity failure.

Example 27 may include the apparatus of Example 26, further comprising means for setting a bit in the stored previous data as the indicator to indicate the integrity failure.

Example 28 may include the apparatus of Example 26, wherein the previous authentication information includes a cryptographic MAC associated with the previous data.

Example 29 may include the apparatus of Example 28, further comprising means for determining if an availability bypass mode is set, means for bypassing encryption, decryption, and integrity checks if the availability bypass mode is set, and means for clearing indicators of integrity failure for data sent to a processor if the availability bypass mode is set.

Example 30 may include the apparatus of Example 29, further comprising means for restoring data to the memory location in the availability bypass mode based on the previous data and the cryptographic MAC associated with the previous data.

Example 31 may include the apparatus of any of Examples 26 to 30, further comprising means for identifying a request to change a key assignment if the indicator is set to indicate the integrity failure and a pre-determined value is stored along with the indicator, and means for changing the key assignment corresponding to the identified request.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
   a processor;
   memory communicatively coupled to the processor; and
   logic communicatively coupled to the processor and the memory to:
      determine if an access request to a memory location of the memory would result in an integrity failure and, if so determined,
      read previous data from the memory location,
      set an indicator to indicate the integrity failure, and
      store the previous data together with the indicator and previous authentication information.

2. The system of claim 1, wherein the logic is further to:
   set a bit in the stored previous data as the indicator to indicate the integrity failure.

3. The system of claim 1, wherein the previous authentication information includes a cryptographic message authentication code associated with the previous data.

4. The system of claim 3, wherein the logic is further to:
   determine if an availability bypass mode is set;
   bypass encryption, decryption, and integrity checks if the availability bypass mode is set; and
   clear indicators of integrity failure for data sent to the processor if the availability bypass mode is set.

5. The system of claim 4, wherein the logic is further to:
   restore data to the memory location in the availability bypass mode based on the previous data and the cryptographic message authentication code associated with the previous data.

6. The system of claim 1, wherein the logic is further to:
   identify a request to change a key assignment if the indicator is set to indicate the integrity failure and a pre-determined value is stored along with the indicator; and
   change the key assignment corresponding to the identified request.

7. A semiconductor package apparatus, comprising:
   one or more substrates; and
   logic coupled to the one or more substrates, wherein the logic is at least partly implemented in one or more of configurable logic and fixed-functionality hardware logic, the logic coupled to the one or more substrates to:
      determine if an access request to a memory location would result in an integrity failure and, if so determined,
      read previous data from the memory location,
      set an indicator to indicate the integrity failure, and
      store the previous data together with the indicator and previous authentication information.

8. The apparatus of claim 7, wherein the logic is further to:
   set a bit in the stored previous data as the indicator to indicate the integrity failure.

9. The apparatus of claim 7, wherein the previous authentication information includes a cryptographic message authentication code associated with the previous data.

10. The apparatus of claim 9, wherein the logic is further to:
    determine if an availability bypass mode is set;
    bypass encryption, decryption, and integrity checks if the availability bypass mode is set; and
    clear indicators of integrity failure for data sent to a processor if the availability bypass mode is set.

11. The apparatus of claim 10, wherein the logic is further to:
    restore data to the memory location in the availability bypass mode based on the previous data and the cryptographic message authentication code associated with the previous data.

12. The apparatus of claim 7, wherein the logic is further to:
    identify a request to change a key assignment if the indicator is set to indicate the integrity failure and a pre-determined value is stored along with the indicator; and
    change the key assignment corresponding to the identified request.

13. The apparatus of claim 7, wherein the logic coupled to the one or more substrates includes transistor channel regions that are positioned within the one or more substrates.

14. A method of controlling memory, comprising:
    determining if an access request to a memory location would result in an integrity failure and, if so determined:
       reading previous data from the memory location;
       setting an indicator to indicate the integrity failure; and
       storing the previous data together with the indicator and previous authentication information.

15. The method of claim 14, further comprising:
    setting a bit in the stored previous data as the indicator to indicate the integrity failure.

16. The method of claim 14, wherein the previous authentication information includes a cryptographic message authentication code associated with the previous data.

17. The method of claim 16, further comprising:
    determining if an availability bypass mode is set;
    bypassing encryption, decryption, and integrity checks if the availability bypass mode is set; and
    clearing indicators of integrity failure for data sent to a processor if the availability bypass mode is set.

18. The method of claim 17, further comprising:
restoring data to the memory location in the availability bypass mode based on the previous data and the cryptographic message authentication code associated with the previous data.

19. The method of claim 14, further comprising:
identifying a request to change a key assignment if the indicator is set to indicate the integrity failure and a pre-determined value is stored along with the indicator; and
changing the key assignment corresponding to the identified request.

20. At least one computer readable storage medium, comprising a set of instructions, which when executed by a computing device, cause the computing device to:
determine if an access request to a memory location would result in an integrity failure and, if so determined:
read previous data from the memory location;
set an indicator to indicate the integrity failure; and
store the previous data together with the indicator and previous authentication information.

21. The at least one computer readable storage medium of claim 20, comprising a further set of instructions, which when executed by the computing device, cause the computing device to:
set a bit in the stored previous data as the indicator to indicate the integrity failure.

22. The at least one computer readable storage medium of claim 21, wherein the previous authentication information includes a cryptographic message authentication code associated with the previous data.

23. The at least one computer readable storage medium of claim 22, comprising a further set of instructions, which when executed by the computing device, cause the computing device to:
determine if an availability bypass mode is set;
bypass encryption, decryption, and integrity checks if the availability bypass mode is set; and
clear indicators of integrity failure for data sent to a processor if the availability bypass mode is set.

24. The at least one computer readable storage medium of claim 23, comprising a further set of instructions, which when executed by the computing device, cause the computing device to:
restore data to the memory location in the availability bypass mode based on the previous data and the cryptographic message authentication code associated with the previous data.

25. The at least one computer readable storage medium of claim 20, comprising a further set of instructions, which when executed by the computing device, cause the computing device to:
identify a request to change a key assignment if the indicator is set to indicate the integrity failure and a pre-determined value is stored along with the indicator; and
change the key assignment corresponding to the identified request.

* * * * *